United States Patent [19]
Barnett et al.

[11] Patent Number: 5,653,063
[45] Date of Patent: Aug. 5, 1997

[54] PHOTOGRAPHIC BOOTHS

[75] Inventors: Gavin Barnett, Cirencester; Anthony Temple, Bristol, both of United Kingdom

[73] Assignee: Prontophot UK Ltd, Staines, United Kingdom

[21] Appl. No.: 564,361

[22] PCT Filed: Jun. 27, 1994

[86] PCT No.: PCT/GB94/01382

§ 371 Date: Mar. 18, 1996

§ 102(e) Date: Mar. 18, 1996

[87] PCT Pub. No.: WO95/01585

PCT Pub. Date: Jan. 12, 1995

[30] Foreign Application Priority Data

Jun. 30, 1993 [GB] United Kingdom ............... 9313454
Apr. 12, 1994 [GB] United Kingdom ............... 9407172

[51] Int. Cl.$^6$ ............................................. G03B 17/53
[52] U.S. Cl. ........................... 52/29; 52/36.1; 52/65; D16/215; D25/16; D25/31
[58] Field of Search ............................ 52/79.4, 27.5, 52/29, 36.1, 245, 65; 354/290, 80, 81; D16/215; D25/16, 31

[56] References Cited

U.S. PATENT DOCUMENTS

| | | | |
|---|---|---|---|
| D. 135,139 | 3/1943 | Godfrey et al. | ............ D16/215 |
| D. 148,740 | 2/1948 | Allen | ............ D25/16 X |
| D. 191,392 | 9/1961 | Dreyfuss | ............ D25/16 |
| D. 213,096 | 1/1969 | Antonio et al. | ............ D25/16 |
| D. 214,888 | 8/1969 | Stewart | ............ D25/31 X |
| D. 221,629 | 8/1971 | King | ............ D25/16 |
| D. 342,542 | 12/1993 | Massarsky | ............ D16/215 |
| 1,780,251 | 11/1930 | Teplow | ............ D25/16 X |
| 3,427,768 | 2/1969 | Fulton | ............ D25/16 X |
| 3,864,708 | 2/1975 | Allen | ............ 354/290 |
| 4,159,171 | 6/1979 | Nineberg. | |
| 4,733,507 | 3/1988 | Doublet | ............ D25/16 X |

FOREIGN PATENT DOCUMENTS 9005295 10/1990 Germany.
2052612 1/1981 United Kingdom.

Primary Examiner—Robert Canfield
Attorney, Agent, or Firm—Christie, Parker & Hale, LLP

[57] ABSTRACT

A photographic booth includes an upright housing for photographic equipment abutting a circular chamber. The chamber has an opening on the opposite side thereof to the housing. A ramp adjacent the opening leads up to the floor of the chamber. A fold-down seat can be folded down to allow able-bodied users to be seated or folded up to provide accommodation for a wheelchair user. An arcuate door is provided to open and close the opening.

17 Claims, 4 Drawing Sheets

PHOTOGRAPHIC BOOTHS

BACKGROUND OF THE INVENTION

The present invention relates to photographic booths.

Photographic booths are located at various public locations such as train stations and shopping arcades for the customer to have passport sized photographs taken. Such booths consist generally of a rectangular chamber having two side walls and two end walls. Mounted externally of the end wall is the housing of an operating system. The operating system comprises a coin operated photographic system which is capable of taking photographs, developing them and then dispensing them in response to the input of the required value of coins. Mounted on the opposite end wall are a series of curtains which can be drawn to provide different backgrounds. In the center of the chamber is a rigid stool which can be raised and lowered as required by the customer. Access to the booth can be gained through an opening on one side wall of the chamber. A half curtain can be drawn across the opening for privacy.

A major disadvantage of the booth is that it cannot be readily accessed by disabled people, particularly, those confined to a wheelchair. Also, the privacy provided by the half curtain is fairly minimal.

SUMMARY OF THE INVENTION

It is an object of the present invention to provide an improved photobooth.

According to the present invention there is provided a photographic booth comprising a chamber to be occupied by the user and having photographic apparatus directed into the chamber on one side thereof and an opening providing access to the user on the opposite side thereof.

According to the present invention there is further provided a photographic booth comprising a part circular chamber to be occupied by the user and having photographic apparatus directed into the chamber on one side thereof, an opening in the circular wall of the chamber which is opened and closed by an arcuate sliding door.

A photographic booth embodying the present invention will now be described, by way of example, with reference to the accompanying diagrammatic drawings.

DETAILED DESCRIPTION

Figure 1:
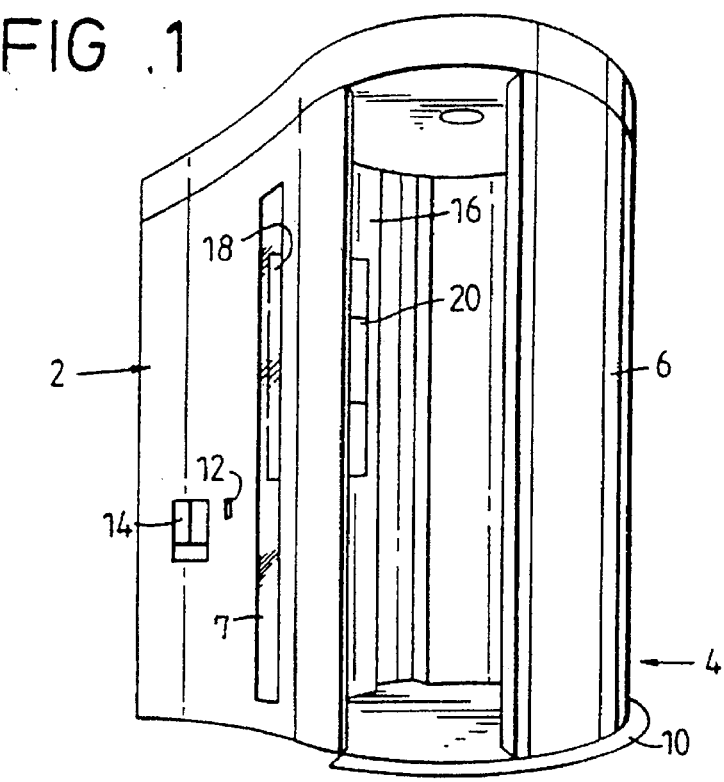
FIG. 1 is a perspective view of a photobooth with the door partially open.
Figure 2:
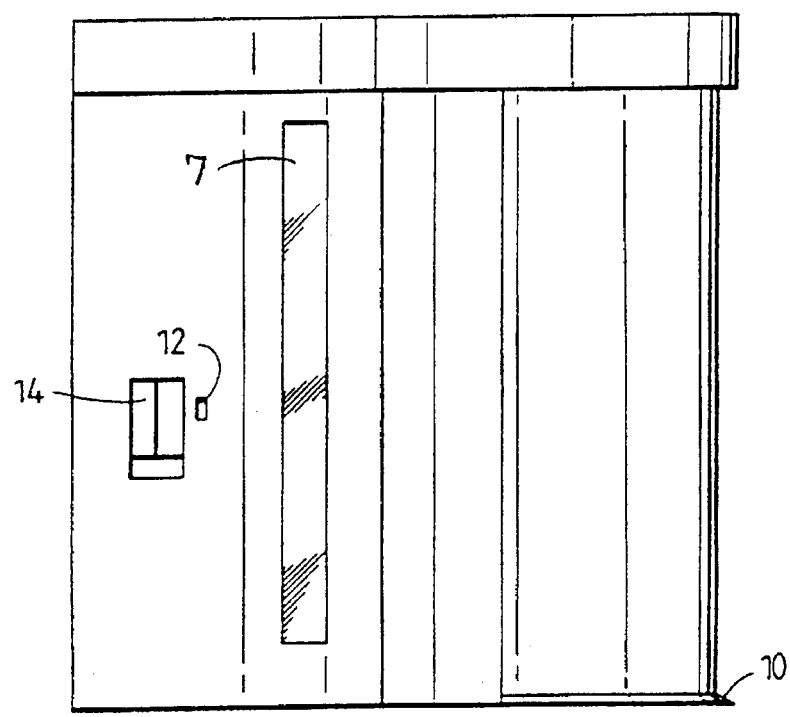
FIG. 2 is a side elevation of the photobooth with the door closed.
Figure 3:
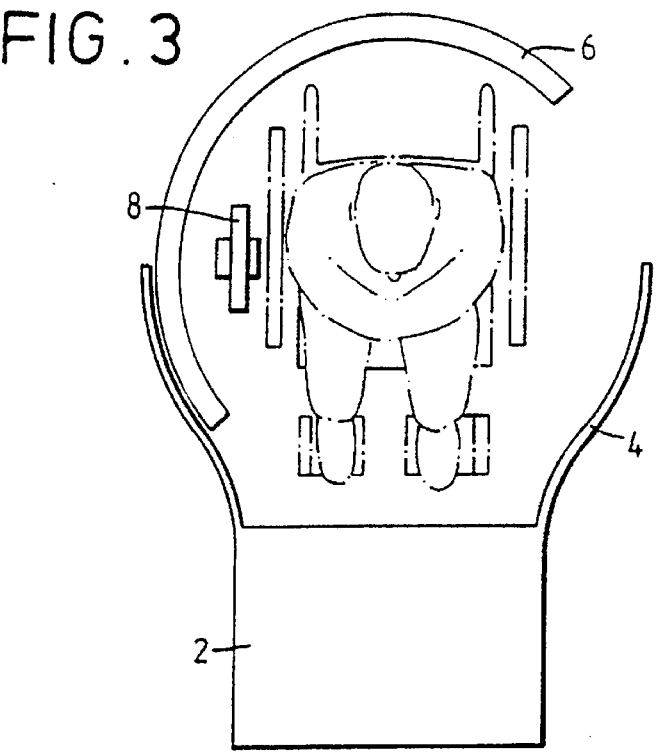
FIG. 3 is a plan view of the photobooth with the roof removed and showing the booth occupied by a person in a wheelchair.

As shown in FIG. 1, the photobooth includes an upright housing 2 generally rectangular in horizontal crosssection coupled to the upright chamber 4 generally circular in horizontal crosssection. The chamber 4 has an arcuate opening in a side thereof remote from the housing 2 which opening is closable by a sliding arcuate door 6. An elongate window 18 is provided on opposite sides of the chamber 4. Each window 18 may be covered on the inside by a blind or curtain (not shown). Located inside the chamber 4 is a fold-down seat 8 (see FIG. 3) which when not in use automatically folds into the vertical position to allow access to the chamber by a wheelchair. An arcuate ramp 10 extends around the opening to the chamber 4 at floor level to provide easy access to the chamber 4 for a wheelchair. On the external wall of the housing is a coin slot 12 for accepting coins to open the door 6 and to initiate a photographic session with the user. Also provided is a photograph discharge chute 14 to discharge the finished photographs which may be passport sized or larger portrait sized photographs.

The wall 16, which the housing 2 has in common with the chamber 4, is provided with a window 18 through which a camera (not shown) located in the housing can take portrait pictures of the customer seated in the chamber 4. The camera is provided with appropriate flashlight facilities and the operation is set in train by the customer operating a series of controls of a control panel 20 mounted in the wall 16. The camera and the controls therefor are well know in the art and so will not be described here.

The sliding door and the apparatus controlling it will now be described in more detail.

The door 4 is generally semicircular and depends downwardly from a circular track in the roof of the chamber so as to be rotatable inside the chamber from a closed position in which it closes the opening in the chamber to a position in which it opens the opening and at the same time covers the camera window 18 and control panel 20. Thus, the control panel 20 and the camera cannot be accessed by the user until the door 6 is closed with the user inside the chamber 4.

Figure 4:
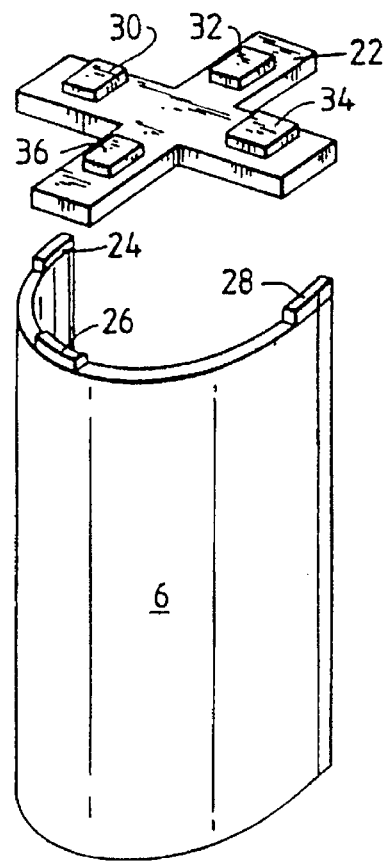
FIG. 4 is an exploded view of the door and its support mechanism.

The door 6, as shown in FIG. 4, is supported by a cruciform beam structure 22. The structure 22 consists of two hollow beams of rectangular section which have been welded together at right angles to each other. Three blocks 24, 26 and 28 upstanding from the upper end of the door 6 and circumferentially spaced at 90° intervals from one another are slotted into and secured to three respective ends of the four ends of the beam structure 22. The beam structure 22 thus carries the door 6.

Each arm of the cruciform structure 22 carries on its upper surface a respective carriage 30, 32, 34 and 36 equiradially spaced from the center of the structure 22. The four carriages 30, 32, 34 and 36 run on an annular rail 40 secured to the underside of the roof of the chamber 4.

Figure 5:
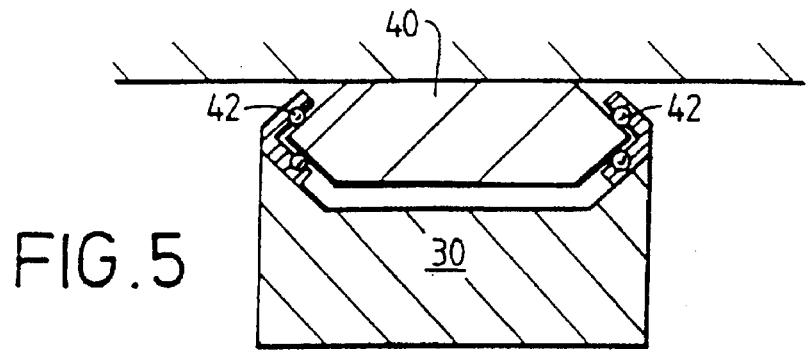
FIG. 5 is a section through a support rail and carriage of the support mechanism of FIG. 4.
Figure 6:
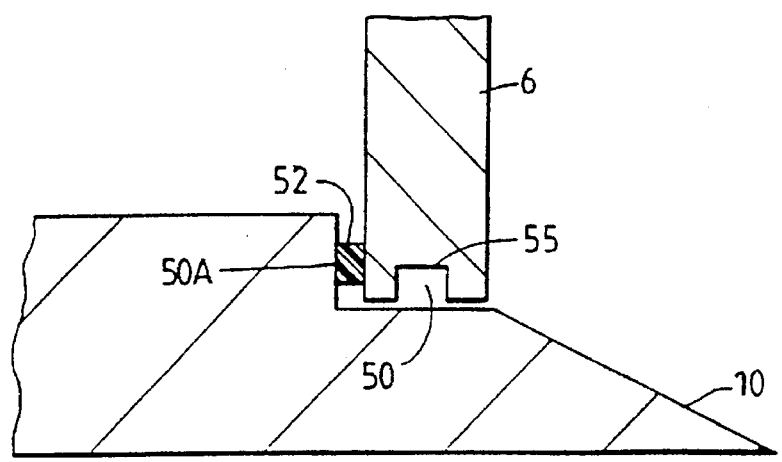
FIG. 6 is a fragmentary section through the lower part of the chamber of the booth.
Figure 7:
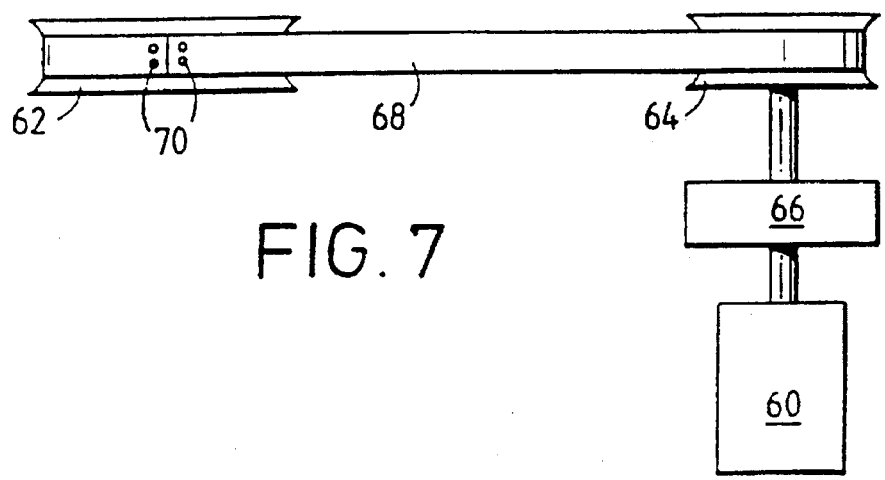
FIG. 7 is a side elevation of the door drive mechanism.

The four carriages are identical and FIG. 5 shows a crosssection through one carriage 30. As can be seen, the rail is a sexagon in crosssection and is engaged on opposite sides by bearings carried by the carriage so that the carriage 30 is held captive on the rail 40 but can run around the rail for the full 360°. The door 6 is thus suspended from the rails 40 and, if unrestrained, can be rotated freely around the rail for a full revolution.

The lower perimeter of the door 6 is accommodated in a slot 50 in ramp 10 to be spaced from the base of the slot 50 by say 5 mm. The inner face of the door carries adjacent the lower perimeter arcuate strip 52 of Nylon (RTM) which bears against the side wall 50A of the slot 50. It will be appreciated that by the manner in which the door is supported from above; there will be a tendency for the door to tilt towards the inner side wall 50A and to resist any forced move radially outwardly.

When the door 6 is closed, its opposite sides are still located within the outerwalls of the chamber 4 and hence the door is held captive by the chamber.

Figure 8:
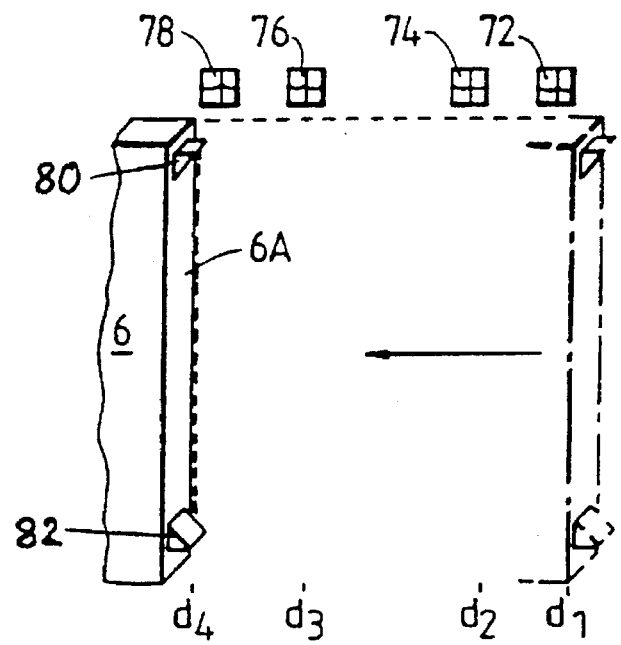
FIG. 8 is a front elevation of the door and its associated detectors.

The door 6 is driven by a motor 60. A pulley wheel 62 is rigid with the cruciform structure having a common axis therewith. The motor 60 drives an auxiliary pulley wheel 64 though a clutch 66. An endless belt 68 couples the pulley wheels 62 and 64 together. The belt 68 is secured to the pulley wheel 62 by rivets 70 at one location. In operation when the motor 60 is energized in response to the insertion of a coin in the slot 12, it will drive the wheel 62 through the clutch 66, the pulley 64 and the belt 68 to cause the door 6 to open. As the door opens, the trailing edge 6A (see FIG. 8) passes four circumferentially spaced detectors 72, 74, 76 and 78. The detectors 72, 74, 76 and 78 are connected to a motor control circuit which controls the speed and direction of the motor. When the trailing edge 6A passes the detector 72, the motor 60 is driven in the forward direction from position $d_1$ to $d_2$ at a uniform acceleration. When the detector 74 detects that the trailing edge 6A has reached position $d_2$, the motor continues at a constant speed. Upon reaching position $d_3$ the motor 60 is decelerated at a constant rate until the trailing edge 6A reaches position $d_4$ as detected by the detector 78. At this point the motor 60 is halted and the door 6 will be in the fully open position.

Upon the user entering the chamber 4 he can operate a button (not shown) to close the door 6. Instead a detector may automatically detect the presence of a user and in response thereto cause the door to close. The trailing edge 6A of the door now becomes the leading edge and the motor 60 is driven in reverse to displace the door at constant acceleration from point $d_4$ to $d_3$ at constant speed from point $d_3$ to $d_2$ and at constant deceleration from $d_2$ to $d_1$ at which point the door is halted. The control here again is carried out under the control of the detectors 78 to 72. When the motor 60 is disengaged it is short circuited to resist any forced displacement in response to forced displacement of the door. Of course, once a predetermined level of force is exceeded, the clutch 66 slips and so allows the door to open.

Figure 9:
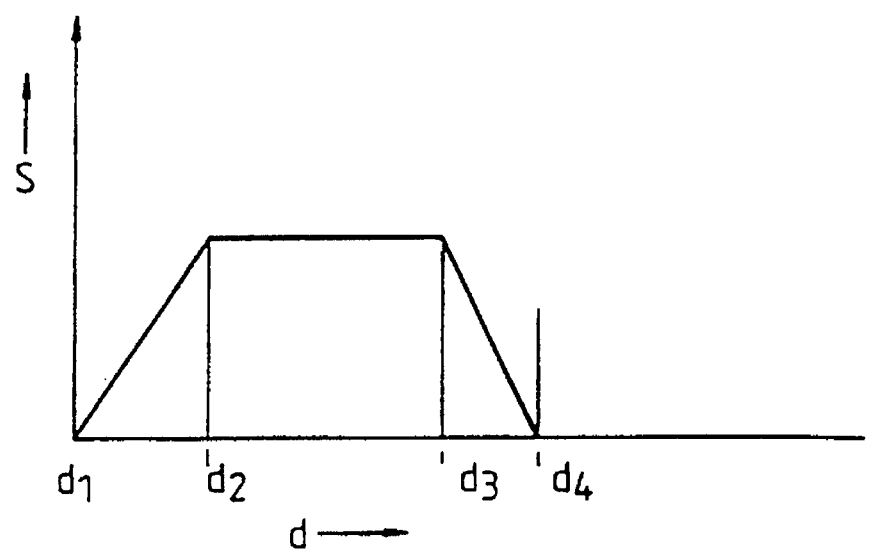
FIG. 9 is a graph of speed versus distance for the door.

The speed at which the door is displaced is more clearly illustrated in FIG. 9 which shows a graph of displacement of the door versus speed.

The edge 6A of the door carries an infrared transmitter 80 located at the upper end directing an infrared beam parallel to, but spaced from, the edge 6A to a detector 82 located at the lower end. Should the edge 6A encounter an obstruction during its travel, the beam will be broken and a circuit (not shown) will be actuated to disengage the motor 60. An automatic delay device (not shown) will act after a predetermined delay after the obstruction ceases to be sensed to cause the motor 60 to resume its operation.

When the door 6 is closed the opposite edges can be engaged from the inside and so in the event of a power failure the user inside can displace the door with sufficient force to overcome the clutch 66 and escape from the chamber 4. However, because the edges cannot be accessed from the outside when the door is closed, the arrangement is resistant to vandalization.

The interior face of the door, because it is curved, helps to defuse any flashlight inside the chamber during a photographic session and so the quality of the photographs produced are better.

Because the belt 68 is riveted to the pulley 62 at one location, the door cannot be driven through 360° but is limited to displacement through just over 180°.

In a modification, the photographic apparatus and its associated cash box may be alarmed so that if tampered with an alarm (not shown) either visible and/or audible will be actuated and the door automatically closed.

In yet another modification an elongate brush member may be located in a channel 55 on the underside of the door to sweep any obstructions out of the path of the door and to maintain the chamber draft proof when the door is closed.

We claim:

1. A photographic booth comprising:

a chamber to be occupied by a user and defining an opening on one side thereof providing access to the user;

a photographic apparatus mounted on a side opposite said opening and directed into the chamber; and a seat located between the apparatus and the opening for use by the user.

2. A photographic booth according to claim 1, including:

a floor inside said chamber and a ramp on the outside of the chamber leading up to the floor inside the chamber.

3. A photographic booth according to claim 1, wherein the chamber is generally circular in horizontal section having a central axis and including an arcuate door mounted inside the chamber to rotate about the axis of the chamber to open and close said opening.

4. A photographic booth comprising:

a wall defining a part circular chamber to be occupied by a user and having an opening on one side thereof;

a photographic apparatus mounted on and directed into the chamber on a side opposite said opening;

an arcuate sliding door mounted on the wall to open and close the opening; and a retractable seat mounted on the wall and movable between a normally retracted position in which access to the chamber can be gained by a wheelchair, and an operative position lying between the opening and the apparatus.

5. A photographic booth according to claim 3 or 4, wherein the door when open obscures said photographic apparatus and when closed allows access to the photographic apparatus.

6. A photographic booth according claim 3, wherein the door is mounted to depend downwardly from a support structure, the support structure being slidably supported from an annular guide by a plurality of carriages.

7. A photographic booth according to claim 6, wherein each carriage is provided with roller bearings engaging said guide.

8. A photographic booth according to claim 3, wherein opposite lateral sides of the door are located within outer walls of the chamber when the door closes the opening.

9. A photographic booth according to claim 3, including an arcuate recess in the floor of said chamber for accommodating the lower extremity of said door, and an arcuate strip of low friction material secured to the inner circumferential face of the lower extremity of the door to slidingly engage the circumferentially inner face of the recess.

10. A photographic booth according to claim 9, wherein the door is so mounted that its center of gravity causes it to tilt in a sense such that the arcuate strip is urged into engagement with the circumferentially inner face of the recess.

11. A photographic booth according to claim 3, including a circumferential groove in the underside of the door accommodating an arcuate brush to brushingly engage the floor of the recess.

12. A photographic booth according to claim 3, including a plurality of detectors arranged in circumferentially spaced locations along the path of the door to detect the passage of the door therepast and control means for controlling drive means driving the door in response to said detectors.

13. A photographic booth according to claim 12, wherein the rate of closure and opening of the door is controlled so that during an initial period the acceleration is constant, during an intermediate period the speed is constant and during a final period the deceleration is constant.

14. A photographic booth according to claim 3 including a photodetection means mounted on at least one edge of the door to detect any obstruction encountered by the door and upon detection to halt displacement of the door.

15. A photographic booth according to claim 12, including clutch means interposed between the drive means and said door to allow said door to be manually forced open when sufficient force is applied to cause said clutch to slip.

16. A photographic booth according to claim 1 wherein the seat is retractable and is normally retracted to allow access by a wheelchair user when required.

17. A photographic booth comprising:

a floor, a wall mounted on the floor and defining a part circular chamber with an opening on one side thereof, photographic apparatus mounted on the wall of the chamber on the opposite side thereof to the opening, a retractable seat mounted one the wall of the chamber movable from a normally retracted position close to the wall of the chamber into an extended position extending into the path between the opening and the apparatus, a support structure carried by the wall, an arcuate door suspended by the support structure for slidable movement, drive means for driving the door between a first position in which it closes the opening and a second position in which it covers the apparatus, an arcuate strip of low friction material secured to the underside of the door to slidingly engage an arcuate recess defined in said floor, a plurality of detectors arranged in circumferentially spaced locations along the path of the door to detect the passage of the door there past, and control means for controlling the movement of the door between said first and second positions in response to the detectors, the drive means being so programmed that the rate of closure and opening of the door is such that during an initial period the acceleration is substantially constant, during an intermediate period the speed is substantially constant while during a final period of detection the acceleration is substantially constant.

* * * * *